US008842383B1

(12) United States Patent
Balamane et al.

(10) Patent No.: US 8,842,383 B1
(45) Date of Patent: Sep. 23, 2014

(54) LASER POWER SENSOR WITH DUAL TEMPERATURE SENSOR

(71) Applicants: Hamid Balamane, Portola Valley, CA (US); John T. Contreras, Palo Alto, CA (US); Samir Garzon, Sunnyvale, CA (US); Fu-Ying Huang, San Jose, CA (US); Lidu Huang, Danville, CA (US); Barry C. Stipe, San Jose, CA (US)

(72) Inventors: Hamid Balamane, Portola Valley, CA (US); John T. Contreras, Palo Alto, CA (US); Samir Garzon, Sunnyvale, CA (US); Fu-Ying Huang, San Jose, CA (US); Lidu Huang, Danville, CA (US); Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/907,157

(22) Filed: May 31, 2013

(51) Int. Cl.
  *G11B 27/36* (2006.01)

(52) U.S. Cl.
  USPC .......................................... 360/31; 369/33.33

(58) Field of Classification Search
  None
  See application file for complete search history.

(56) References Cited

U.S. PATENT DOCUMENTS

| 6,982,843 | B2 | 1/2006 | Coffey et al. |
| 8,023,226 | B2 | 9/2011 | Shimazawa et al. |
| 8,310,903 | B1 | 11/2012 | Takayama et al. |
| 2009/0225464 | A1 | 9/2009 | Juang et al. |
| 2011/0299367 | A1 | 12/2011 | Naniwa et al. |
| 2012/0051196 | A1 | 3/2012 | Grobis et al. |
| 2012/0127839 | A1* | 5/2012 | Rawat et al. ............... 369/13.33 |
| 2012/0201108 | A1 | 8/2012 | Zheng et al. |
| 2012/0300599 | A1 | 11/2012 | Contreras et al. |
| 2013/0107390 | A1* | 5/2013 | Huang et al. .................... 360/31 |

OTHER PUBLICATIONS

Black, Eric J.; "Optical Path Integration in Heat Assisted Magnetic Recording"; Carnegie Mellon University, Aug. 2010; Pittsburgh, PA USA, 176 pages.

* cited by examiner

*Primary Examiner* — Paul Huber
(74) *Attorney, Agent, or Firm* — Patterson & Sheridan, LLP (57) ABSTRACT

Embodiments of the present invention generally relate to a HAMR device having two temperature sensors disposed between a near field transducer (NFT) and a return pole. The two temperature sensors are aligned in a cross-track direction.

20 Claims, 9 Drawing Sheets

LASER POWER SENSOR WITH DUAL TEMPERATURE SENSOR

BACKGROUND

1. Field

Embodiments of the present invention generally relate to data storage systems, and more particularly, to thermally assisted recording devices.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources. A temperature sensor has been utilized to measure the output of the optical sources such as a laser beam. However, the HAMR head temperature may also be affected by factors such as slider flight condition. Thus, the temperature sensor may not able to differentiate the temperature variation due to optical power fluctuation or the slider flight condition change. Therefore, an improved HAMR device is needed.

SUMMARY OF THE INVENTION

Embodiments of the present invention generally relate to a HAMR device having two temperature sensors disposed between a near field transducer (NFT) and a return pole. The two temperature sensors are aligned in a cross-track direction.

In one embodiment, a heat assisted magnetic recording device is disclosed. The heat assisted magnetic recording device includes a first temperature sensor disposed between a near field transducer and a return pole, and a second temperature sensor disposed between the near field transducer and the return pole. The first temperature sensor and the second temperature sensor are aligned in a cross-track direction.

In another embodiment, a heat assisted magnetic recording device is disclosed. The heat assisted magnetic recording device includes a near field transducer, a cladding material disposed adjacent the near field transducer, a first temperature sensor embedded in the cladding material and a second temperature sensor embedded in the cladding material. The first temperature sensor and the second temperature sensor are aligned in a cross-track direction. The heat assisted magnetic recording device further includes a return pole disposed adjacent the cladding material.

In another embodiment, a heat assisted magnetic recording device is disclosed. The heat assisted magnetic recording device includes a write pole, a pole lip disposed adjacent the write pole, a near field transducer disposed adjacent the pole lip, a cladding material disposed adjacent the near field transducer, a first temperature sensor embedded in the cladding material, and a second temperature sensor embedded in the cladding material. The first temperature sensor and the second temperature sensor are aligned in a cross-track direction. The heat assisted magnetic recording device further includes a return pole disposed adjacent the cladding material.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a HAMR device having two temperature sensors disposed between a NFT and a return pole. The two temperature sensors are aligned in a cross-track direction.

Figure 1A:
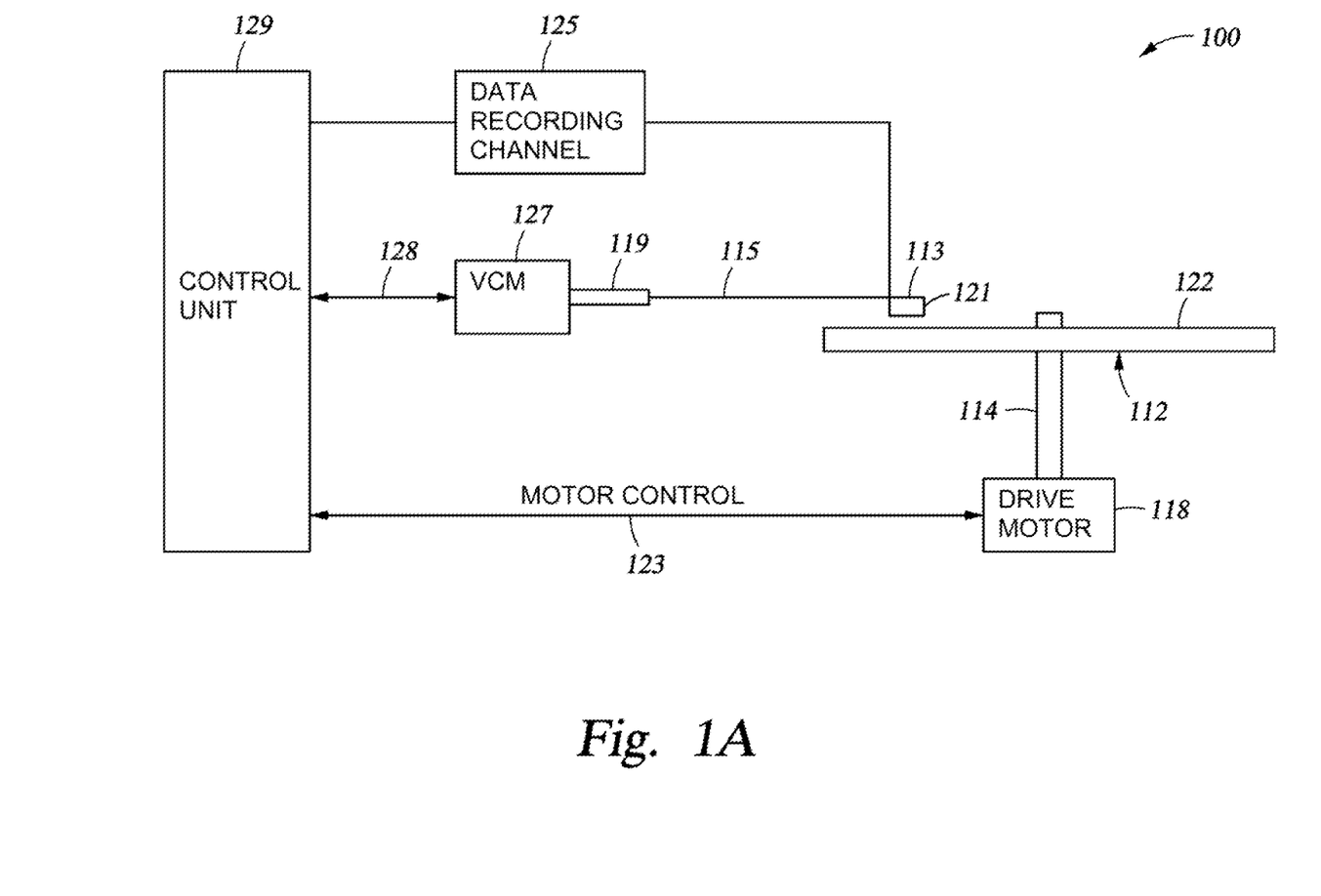
FIGS. 1A-B illustrate a disk drive system, according to embodiments of the invention.

FIG. 1A illustrates a disk drive embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases slider 113 towards the disk surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129. During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by control unit 129, such as access control signals and internal clock signals. Typically, the control unit 129 includes logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
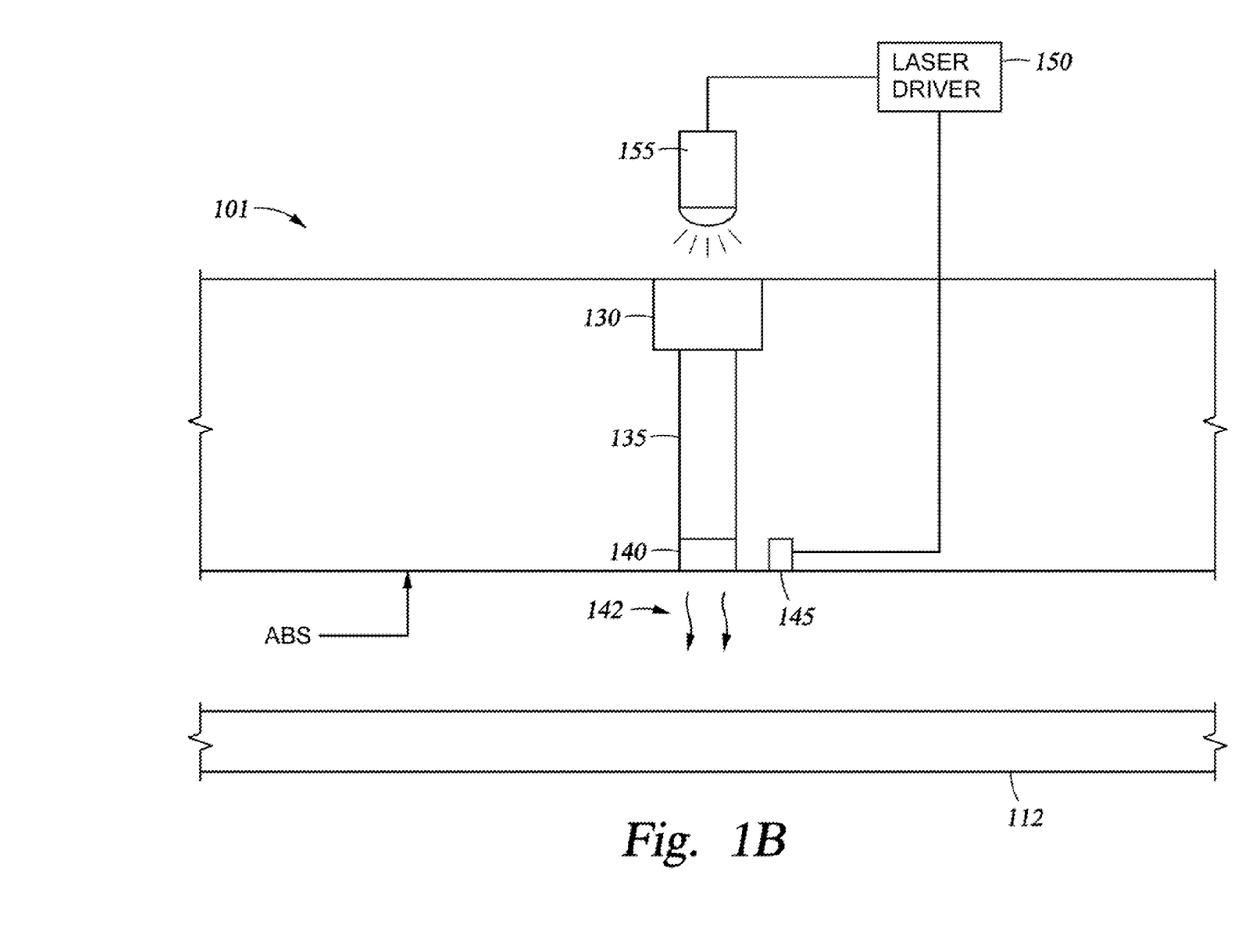

FIG. 1B is a cross sectional schematic of a HAMR enabled write head 101, according to one embodiment of the invention. The head 101 is operatively attached to a laser 155 that is powered by a laser driver 150. The laser 155 may be placed directly on the head 101 or radiation may be delivered from a laser 155 located off the slider 113 through an optical fiber or waveguide. Similarly, the laser driver 150 circuitry may be located on the slider 113 or on a system-on-chip (SOC) associated with the disk drive 100 such as control unit 129. The head 101 includes a spot-size converter 130 for focusing the radiation transmitted by the laser 155 into the waveguide 135. In another embodiment, the disk drive 100 may include one or more lens for focusing the beamspot of the laser 155 before the emitted radiation reaches the spot-size converter 130. The waveguide 135 is a channel that transmits the radiation through the height of the head 101 to the NFT 140—e.g., a plasmonic device or an optical transducer—which is located at or near the air-bearing surface (ABS). The NFT 140 further focuses the beamspot to avoid heating neighboring tracks of data on the disk 112—i.e., creates a beamspot much smaller than the diffraction limit. As shown by arrows 142, this optical energy emits from the NFT 140 to the surface of the disk 112 below the ABS of the head 101. The embodiments herein are not limited to any particular type of NFT and may operate with, for example, either a c-aperature, e-antenna plasmonic near-field source, or any other shaped transducer known in the art.

A temperature sensor 145 may be located proximate to the NFT 140. Because the NFT 140 is unable to transfer all of the radiation transmitted by the waveguide 135 to the magnetic media, at least a portion of the optical energy heats the head 101. The temperature sensor 145 may be a thermistor or resistance temperature detector (RTD) where the electrical resistance of the material comprising the sensor 145 changes as the temperature of the material varies (either inversely or directly). The temperature sensor 145 may be electrically coupled to the laser driver 150 or some other control device to measure the electrical resistance of the sensor 145. This change may then be used as a feedback control signal to adjust the power of the laser 155. For example, the laser driver 150 may provide a constant voltage across the temperature sensor 145. If the measured current begins to decrease—e.g., the electrical resistance of the sensor 145 increases—then the laser driver 150 may decrease the power of the laser 155 to decrease the temperature of the temperature sensor 145 and presumably other components of the head 101. This feedback control permits the disk drive 100 to perform HAMR at a sufficient temperature without damaging the head 101 by, for example, pole-tip protrusion or metal diffusion of the near-field transducer.

The temperature of the temperature sensor 145 may be affected by the optical power fluctuation, or by the slider flight condition. With only one temperature sensor 145, the temperature variation due to optical power fluctuation or the slider flight condition change may not be differentiated. Thus, a second temperature sensor (discussed in detail below) may be added to reduce the effect due to slider flight condition variation. The second temperature sensor may operate in the same way as the temperature sensor 145, as described above.

Figure 2:
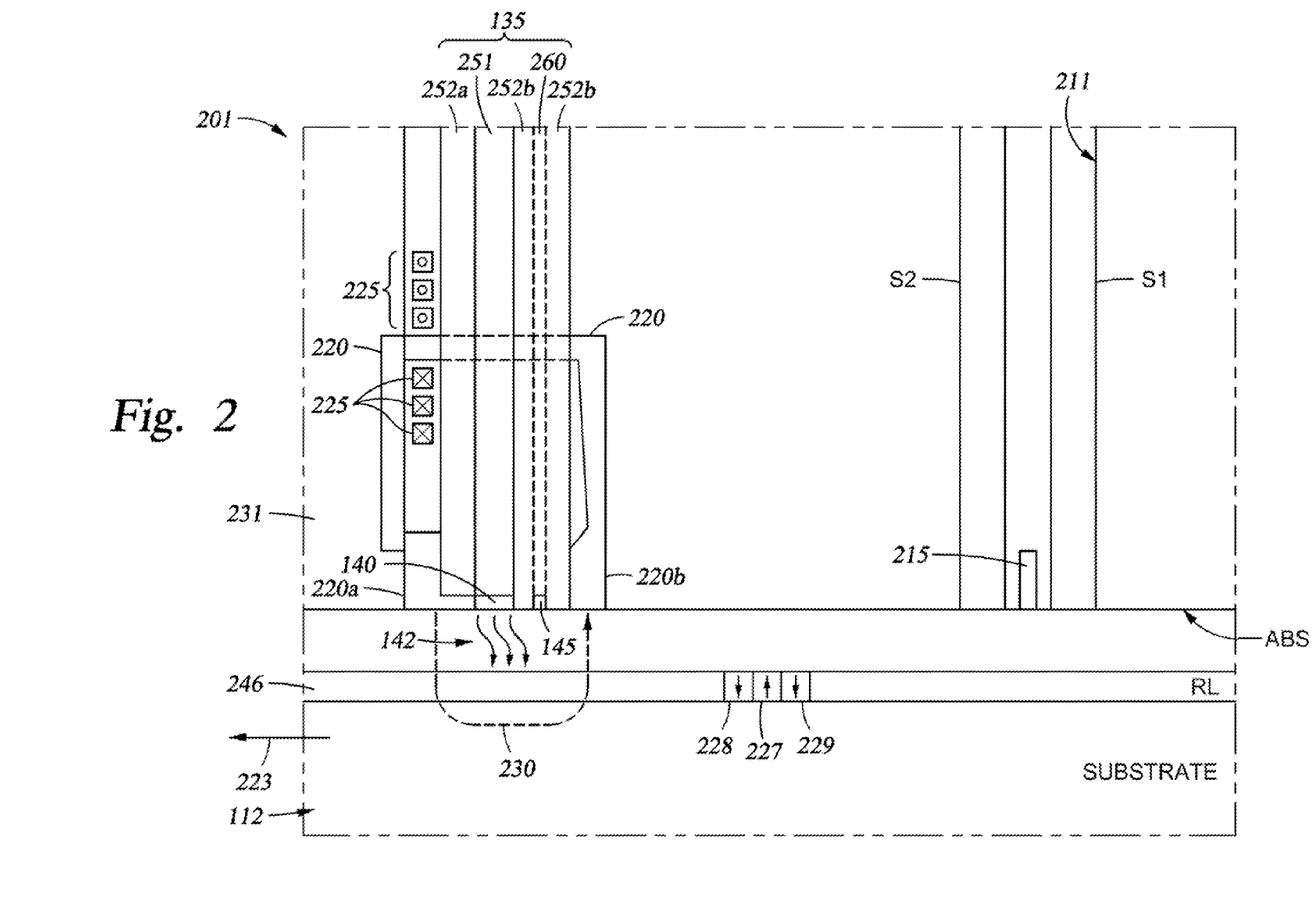
FIG. 2 illustrates a cross-sectional schematic diagram of a HAMR enabled head of a disk drive, according to one embodiment of the invention.

FIG. 2 illustrates a cross-sectional schematic diagram of a HAMR enabled disk drive, according to one embodiment of the invention. Specifically, FIG. 2 illustrates a portion of a head 201 and associated perpendicular magnetic recording disk 112 for a HAMR disk drive which uses an optical channel or waveguide 135 for directing heat to the disk. The disk 112 includes a substrate and a perpendicular magnetic recording layer (RL) 246. In one embodiment, the disk 112 may include an optional "soft" or relatively low-coercivity magnetically permeable underlayer (SUL). However, the SUL is not required for a HAMR disk drive 100.

The RL 246 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 246 may also be an $L1_{10}$ ordered alloy such as FePt or FeNiPt. The disk 112 may also include a protective overcoat (not shown) over the RL 246.

The head 201 has a substrate trailing surface 211 and an ABS surface oriented generally perpendicular to trailing surface 211. The trailing surface 211 is typically formed of a composite material, such as a composite of alumina/titanium-carbide ($Al_2O_3$/TiC), and supports the read and write elements which are typically formed as a series of thin films and structures on the trailing surface 211. The disk 112 may spin in a direction 223 away from the trailing surface 211 and towards the other layers of the head 201. The ABS is the recording-layer-facing surface of the slider that faces the disk 112. Note that FIG. 2 is not drawn to scale because of the difficulty in showing the very small features and, for the sake of clarity, omits structures from the head such as spacing and insulating layers.

The head 201 includes a magnetoresistive read pole 215 located between shields S1 and S2, and a perpendicular write head that includes a magnetic yoke 220 with a write pole 220a, a return pole 220b, and an electrically conductive coil 225. The write pole 220a is formed of a high-moment material, such as a NiFe or FeCoNi alloy. The write coil 225 is wrapped around the yoke 220 with the electrical current directions being shown as into the paper by the coil cross-sections marked with an "X" and out of the paper by the coil cross-sections marked with a solid circle. When write-current pulses are directed through the coil 225, the write pole 220a directs magnetic flux, represented by arrow 230, to the RL 246. Further, the magnetic flux 230 continues through the substrate or a SUL layer before arriving at the return pole 220b. However, the invention is not limited to the structure and material discussed above. For example, the coil 225 may be a helical coil or the write pole 220a may include a wrap-around shield. Further, the present invention may operate with any recording head that can perform the functions discussed herein.

The head 201 may also include the waveguide 135 with the NFT 140 near or at the ABS. As shown, the waveguide 135 and NFT 140 extend through the yoke 220 and are located between the write pole 220a and the return pole 220b. As noted by the ghosted lines, the yoke 220 may continuously connect the write pole 220a to the return pole 220b. The waveguide 135 and NFT 140 may be fabricated at any location such that the NFT 140 passes over a portion of the spinning magnetic disk 112 prior to that portion passing below the write pole 220a. Specifically, the waveguide 135 may be located between shield S2 and return pole 220b, or between the write pole 220a and the outer face 231 of the head 201 (if the disk 112 rotates opposite of the direction 223 shown). While writing to the disk 112, the RL 246 moves relative to the head 201 in the direction shown by arrow 223. In HAMR, the optical energy 142 emitted from the NFT 140 temporarily lowers the coercivity ($H_c$) of the RL 246 so that the magnetic recording regions 227, 228, 229 may be oriented by the write field from write pole 220a. The magnetic recording regions 227, 228, 229 become oriented by the write field if the write field ($H_w$) is greater than $H_c$. After a region of the RL 246 in the data track has been exposed to $H_w$ from the write pole 220a and the resulting heat from the optical energy 142 from the NFT 140, the region's temperature falls below the Curie temperature and the data associated with the magnetic orientations is recorded. Specifically, the transitions between recorded regions (such as previously recorded regions 227, 228, and 229) represent written data "bits" that can be read by the read pole 215. In this manner, the NFT 140 uses the optical energy 142 to heat the RL layer 246 and lower its magnetic coercivity.

The waveguide 135 is formed of a core material 251 such as a high-index-of-refraction dielectric material that is transmissive to radiation at the wavelength of the laser radiation source—e.g., around 780 nm. Typical radiation-transmissive materials include, for example, $TiO_2$ and $Ta_2O_5$. The radiation-transmissive core material 251 is surrounded by a cladding material 252a, b that has a lower refractive index than the core material 251 and is transmissive to radiation at the wavelength of the laser radiation source—e.g., laser 155. Typical cladding materials include $SiO_2$ and $Al_2O_3$.

The head 201 may also include a first temperature sensor 145 and a second temperature sensor (not shown), both embedded in the cladding material 252b. Because the two temperature sensors are aligned in a cross-track direction (into the paper), meaning the two sensors are disposed on a plane that is perpendicular to direction 223, the second temperature sensor is blocked by the first temperature sensor 145. Each temperature sensor may be connected to at least one sensor lead 260 that provides an electrical connection to a connector pad (not shown) located at the top of the head 201—i.e., the side opposite the ABS. From there, a wire may electrically connect the temperature sensors to the laser driver 150 as shown in FIG. 1B.

In one embodiment, the two temperature sensors may not be located in the cladding material 252b but may be embedded in a separate non-magnetic and insulative material that is located between the NFT 140 and the return pole 220b.

Figure 3:
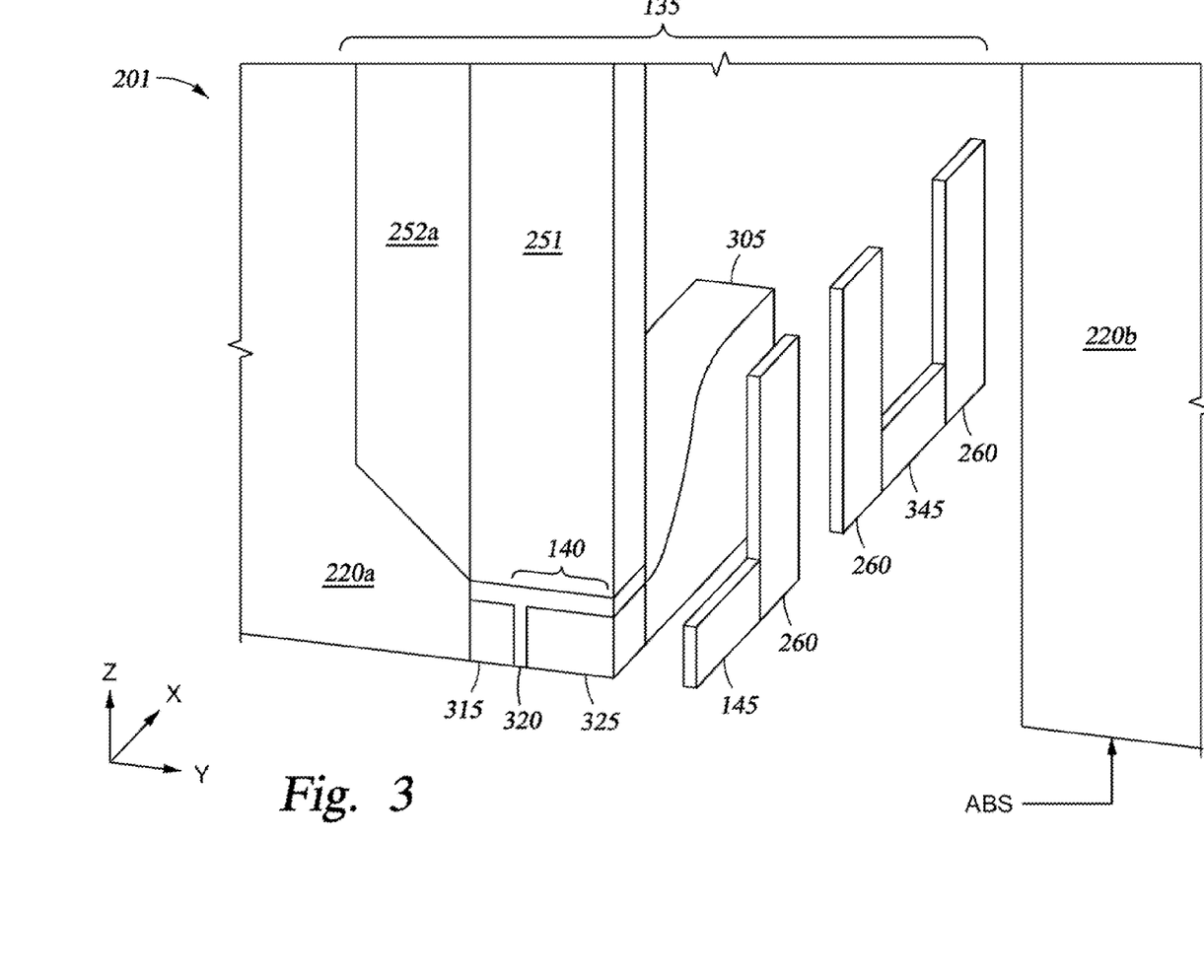
FIG. 3 illustrates a cross-sectional schematic diagram of a HAMR enabled head, according to one embodiment of the invention.

FIG. 3 illustrates a cross-sectional schematic diagram of the HAMR enabled head 201, according to one embodiment of the invention. As shown, this portion of the head 201 includes the waveguide 135 but with cladding 252b (and any cladding on the back-side of the head 201) removed to better illustrate the details of the temperature sensors 145, 345, sensor lead 260, and heat sink 305. The NFT 140 may be directly or thermally coupled to the heat sink 305 for removing excess heat from the NFT 140. Because FIG. 3 is a cross-section of head 201, there may be another heat sink located opposite the heat sink 305 depicted. The return pole 220b is shown between the temperature sensors 145, 345 and the shield layers S1, S2 or read pole 215 (not shown). The core 251 may terminate at the NFT 140. The NFT 140 at least includes an antenna 325 and dielectric 320. In one embodiment, a pole lip 315 may be disposed between the write pole 220a and the NFT 140. The antenna 325 may be Cu, Au, Ag, or alloys thereof. The dielectric 320 is an aperture or opening that may be filled with radiation-transmissive material such as $SiO_2$ or other dielectric material. In one embodiment, the dielectric 320 may comprise of the same material as the cladding 252a, b. The pole lip 315 may comprise of Ni, Co, Fe, or some combination or alloy thereof. The NFT 140 uses the antenna 325 and dielectric 320 to further focus the beam-spot onto the magnetic media 112.

As shown in FIG. 3, the first temperature sensor 145 and the second temperature sensor 345 are aligned in the cross-track direction, represented by the x axis, meaning the two temperature sensors 145, 345 are disposed at the same down-track location (i.e., same location on the y axis). In addition, since the elements of the head 201 are fabricated along the down-track direction, the two temperature sensors 145, 345 are deposited at the same time on a plane between the NFT 140 and the return pole 220b. The two temperature sensors 145, 345 have the same resistance since they are formed in the same layer. In one embodiment, both temperature sensors 145, 345 are disposed at the ABS.

Figure 4:
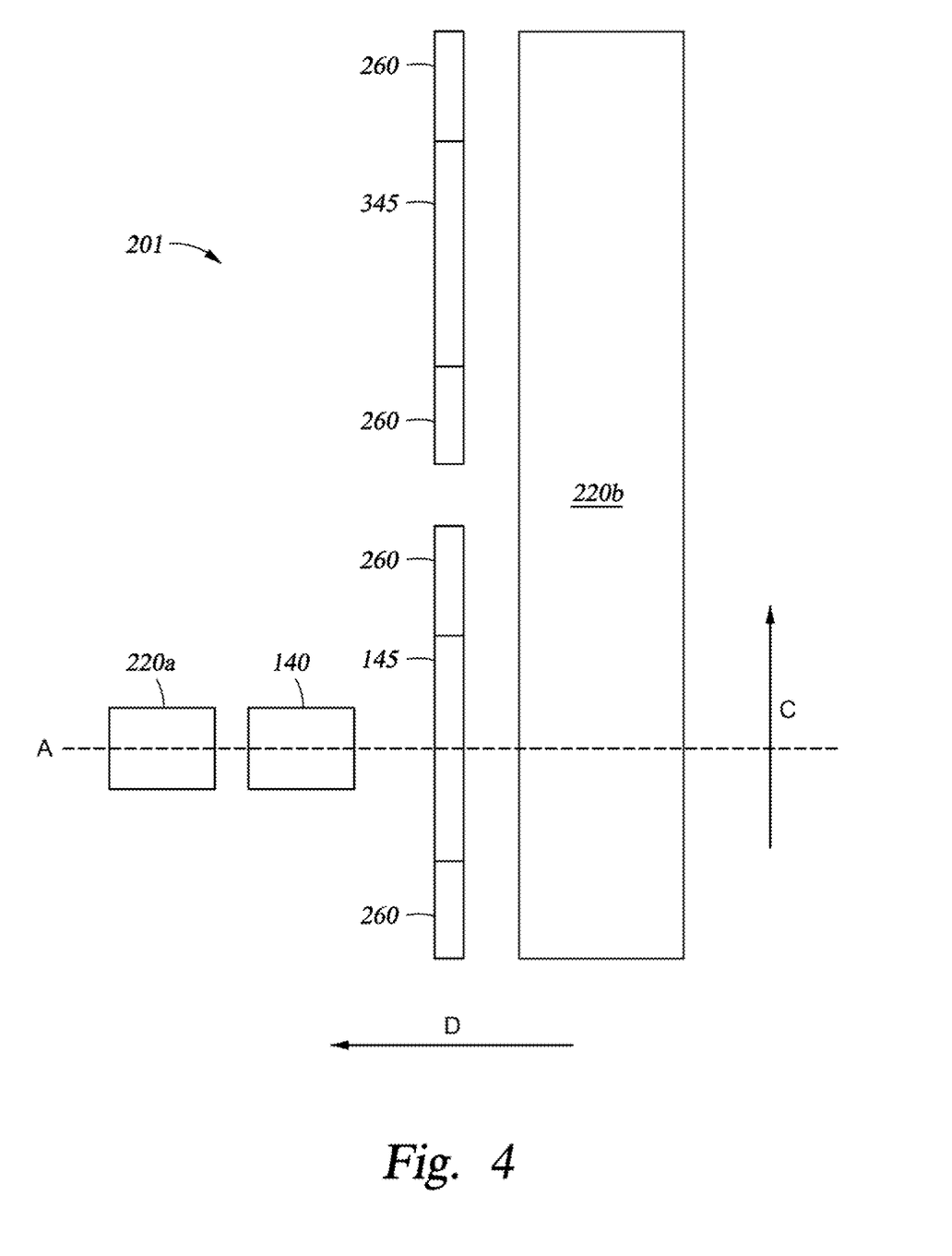
FIG. 4 illustrates an ABS view of a HAMR enabled head, according to one embodiment described herein.

FIG. 4 illustrates an ABS view of the HAMR enabled head 201, according to one embodiment described herein. Certain elements have been removed to better illustrate the position of the temperature sensors 145, 345. As shown in FIG. 4, the temperature sensors 145, 345 are both disposed between the NFT 140 and the return pole 220b, and the write pole 220a is disposed on the other side of the NFT 140. The two temperature sensors 145, 345 are aligned in the cross-track direction, as indicated by arrow "C," and are disposed at the same down-track location with the down track direction indicated by arrow "D."

The first temperature sensor 145 is centered with the NFT 140 and the write pole 220a with respect to the cross-track direction, meaning the first temperature sensor 145, the NFT 140 and the write pole 220a all share the same center line "A" with respect to the cross-track direction. The second temperature sensor 345 is offset from the center line "A" and is further away from the NFT 140. Since the second temperature sensor 345 is further away from the NFT 140, the second temperature sensor 345 has a slower response time than the first temperature sensor 145.

Figure 5:
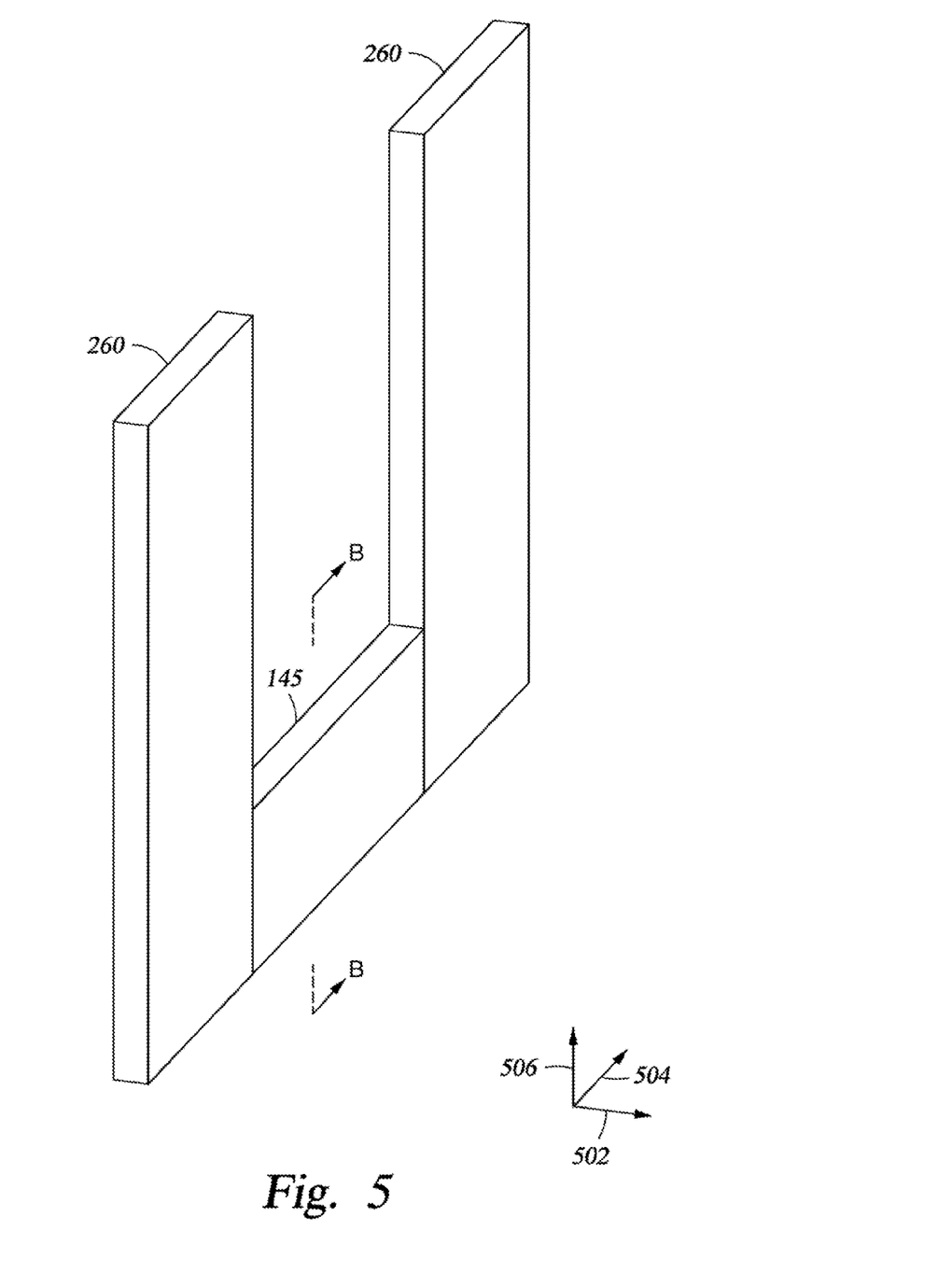
FIG. 5 is a schematic of a temperature sensor with sensor leads, according to one embodiment of the invention.

FIG. 5 is a schematic of the temperature sensor 145 with sensor leads 260, according to one embodiment of the invention. As shown, the temperature sensor 145 is connected to two sensor leads 260 on opposite ends. However, the sensor leads 260 may be connected to the temperature sensor 145 in whatever manner that permits an electric current to flow through at least a portion of the temperature sensor 145 when a voltage potential is applied across the sensor leads 260. The dotted line "B-B" illustrates the cross sectional view that is shown in FIG. 3 of the sensor 145 and sensor leads 260.

Suitable materials for the temperature sensor 145 include Ta, Pt, Au, Rh, NiFe, or alloys thereof. The sensor leads 260 may comprise Ru with thickened Cu/Ta leads. The temperature sensor 145 may have a length of about 800 nm, a height of about 100 nm, and a thickness ranging from about 50 nm to about 75 nm. As used herein, arrow 502 corresponds to the direction of the thickness, arrow 504 corresponds to the direction of the length, and arrow 506 corresponds to the direction of the height of the structures illustrate in the three-dimensional FIGS. 3 and 5. The second temperature sensor 345 may be identical to the temperature sensor 145 in all aspects.

Figure 6:
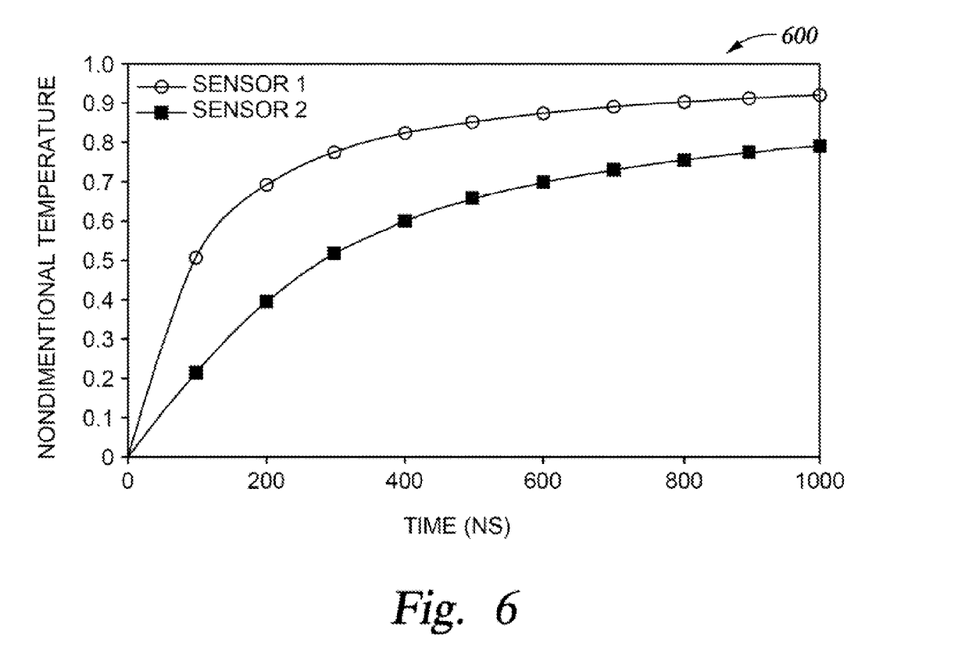
FIG. 6 is a graph showing a relationship between time and temperature for a first temperature sensor and a second temperature sensor, according to one embodiment of the invention.

During operation, there may be a ramping period for the temperature to increase to a steady state temperature as the NFT 140 is heated by the laser 155. However, it is desirable to know the steady state temperature as soon as the laser 155 is turned on. FIG. 6 illustrates a graph 600 showing the relationship between time and temperature for sensor 1 and sensor 2. Sensor 1 may be the first temperature sensor 145 and sensor 2 may be the second temperature sensor 345, both described in FIG. 3. The graph 600 shows two trend lines, one for sensor 1 and the other for sensor 2, each showing a relationship between time and nondimentional (i.e., normalized) temperature. Because sensor 2 is disposed further away from the NFT, sensor 2 has a slower response time than sensor 1. Thus, sensor 2 senses a lower temperature than sensor 1 at a particular time. The nondimentional temperature is calculated by dividing the actual temperature reading by the steady state temperature.

The steady state temperature may be predicted before the steady state temperature is reached based on the trend lines in graph 600. For example, at 200 ns, sensor 1 senses a temperature that is 70% of the steady state temperature, and sensor 2 senses a temperature that is 40% of the steady state temperature. The steady state temperature is calculated by dividing the sensor 1 temperature reading by 0.7, or dividing the sensor 2 temperature reading by 0.4.

Figure 7:
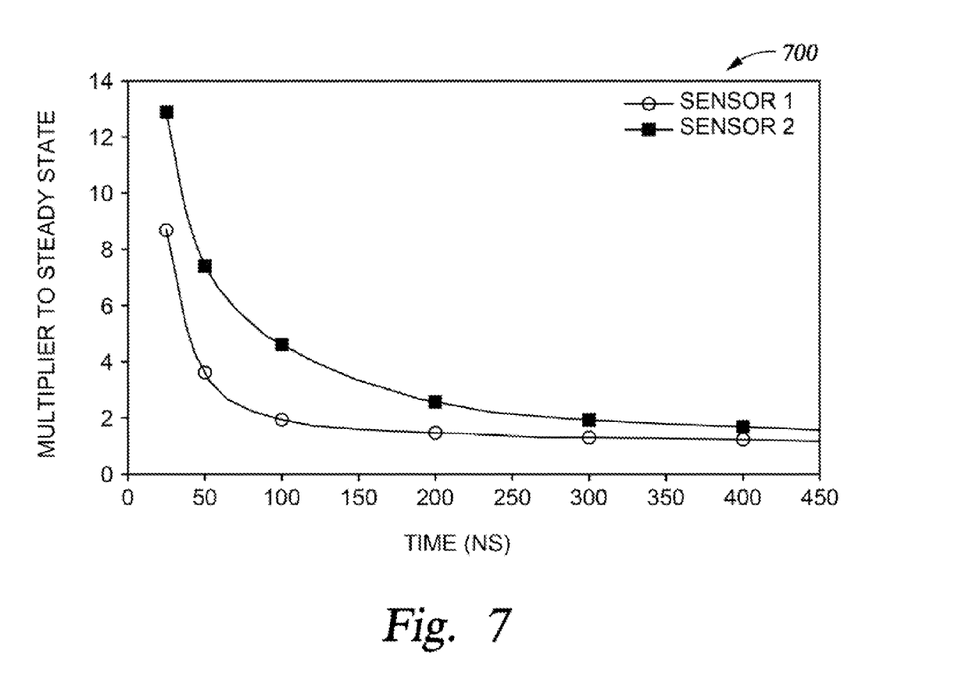
FIG. 7 is a graph showing a relationship between time and multiplier to a steady state temperature for a first temperature sensor and a second temperature sensor, according to one embodiment of the invention.

FIG. 7 is a graph 700 showing a relationship between time and multiplier to a steady state temperature for sensor 1 and sensor 2, according to one embodiment of the invention. The multiplier to a steady state temperature, shown on the y axis, is the inverse of the nondimentional temperature (i.e., 1 divided by nondimentional temperature). Thus, to predict the steady state temperature based on the graph 700, the temperature reading of either sensor 1 or sensor 2 should be multiplying by the multiplier instead of dividing by the nondimentional temperature. For example, at 200 ns, the steady state temperature should be calculated by multiplying sensor 2 temperature reading by 2.5, which arrives at the same steady state temperature as dividing the temperature reading by 0.4, as indicated in graph 600.

Figure 8:
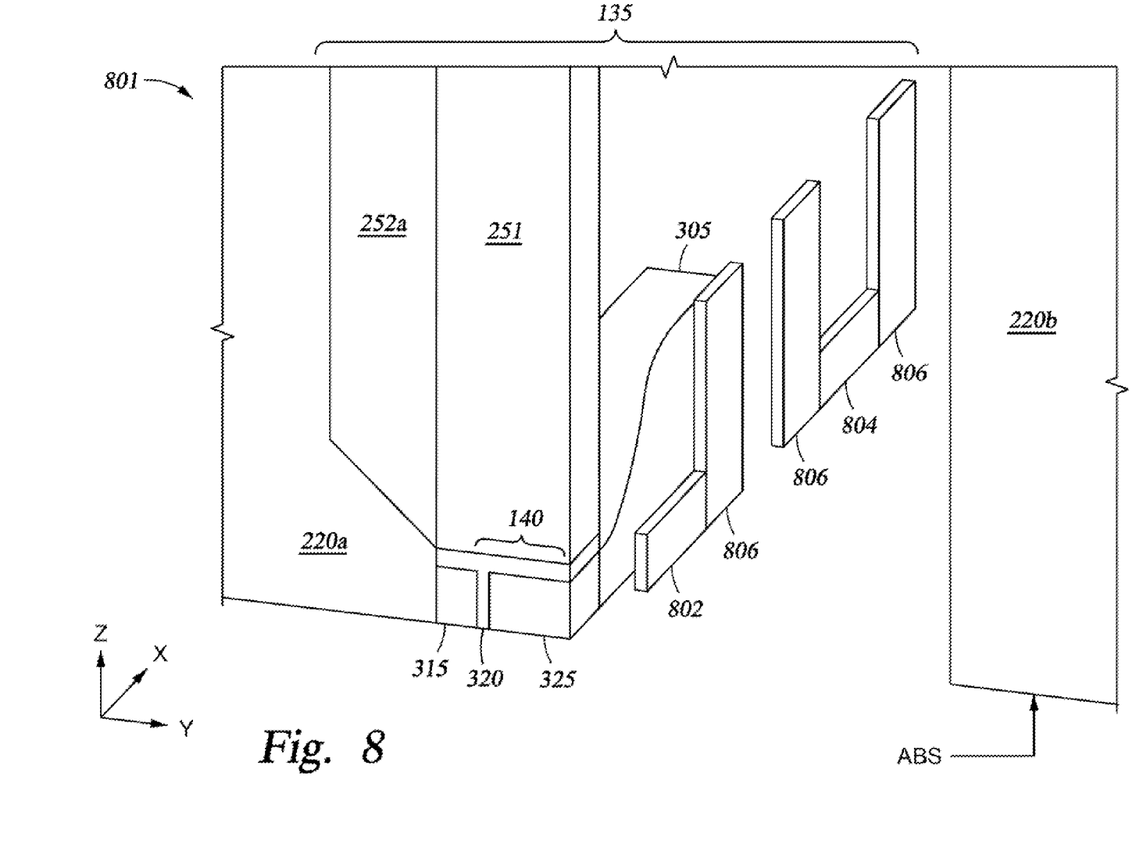
FIG. 8 illustrates a cross-sectional schematic diagram of a HAMR enabled head, according to one embodiment described herein.
Figure 9:
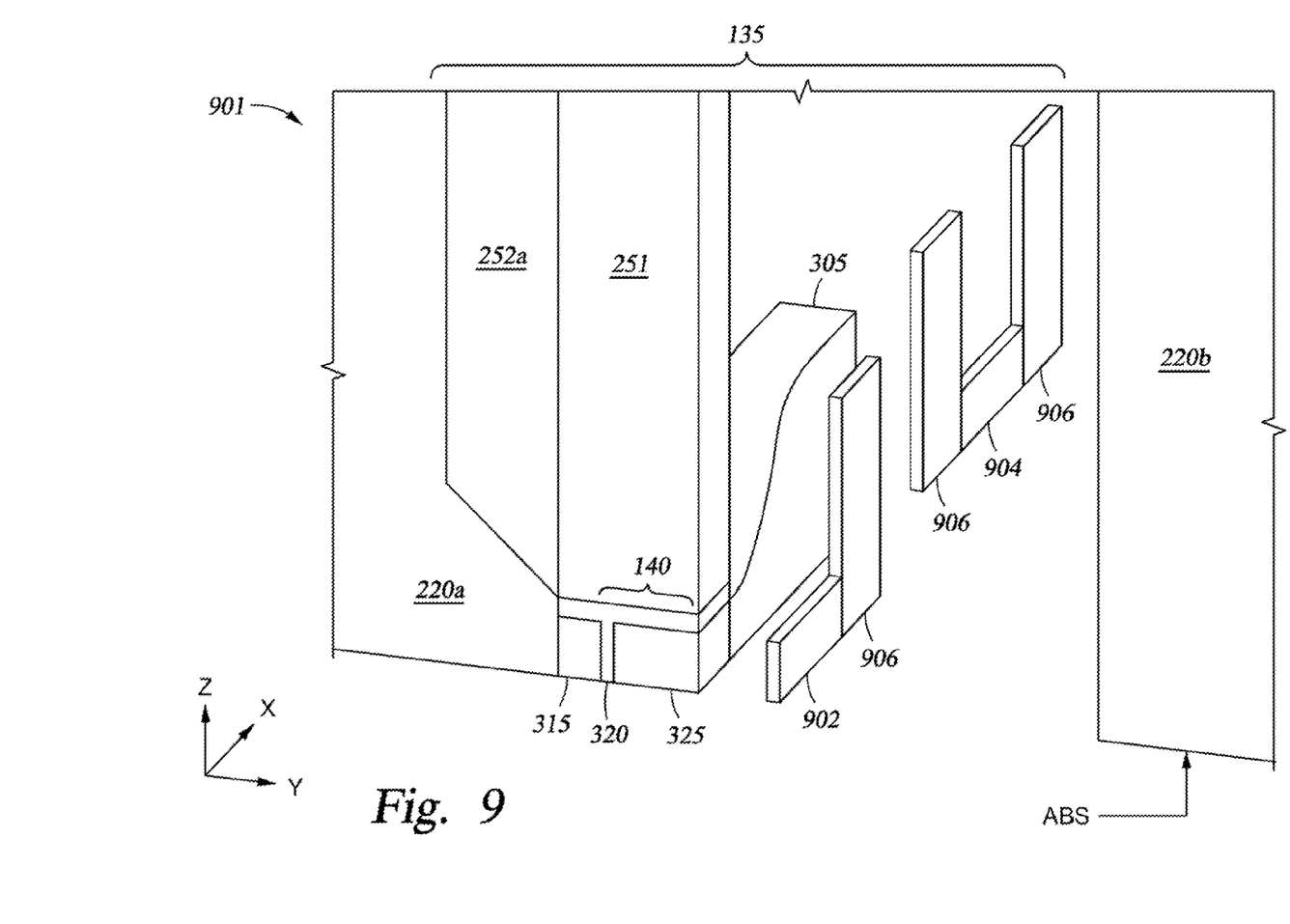
FIG. 9 illustrates a cross-sectional schematic diagram of a HAMR enabled head, according to one embodiment described herein.

The embodiments of the invention described above relate to two temperature sensors both disposed at the ABS, as shown in FIG. 3. In other embodiments, the two temperature sensors may be disposed at different locations with respect to the ABS. FIGS. 8 and 9 illustrate such embodiments.

FIG. 8 illustrates a cross-sectional schematic diagram of a HAMR enabled head 801. The head 801 is identical to the head 201, except that the first temperature sensor 802, the second temperature sensor 804, and the sensor leads 806 are all recessed from the ABS. In one embodiment, the temperature sensors 802, 804 are disposed at the same location on the z axis. In another embodiment, the temperature sensors 802, 804 are disposed at different locations on the z axis. One sensor may be disposed higher on the z axis than the other sensor.

FIG. 9 illustrates a cross-sectional schematic diagram of a HAMR enabled head 901. The head 901 is identical to the head 201, except that only one temperature sensor is disposed at the ABS. In one embodiment, as shown in FIG. 9, a first temperature sensor 902 and the sensor leads 906 attached thereto are recessed from the ABS. The second temperature sensor 904 and the sensor leads 906 attached thereto are disposed at the ABS. In another embodiment, the first temperature sensor 902 and the sensor leads 906 attached thereto are disposed at the ABS, while the second temperature sensor 904 and the sensor leads 906 attached thereto are recessed from the ABS.

In summary, a heat assisted magnetic recording device is disclosed. The device has two temperature sensors disposed between the NFT and the return pole and the two temperature sensors are aligned in the cross-track direction. With two temperature sensors, temperature variation due to optical power fluctuation or slider flight condition change may be differentiated.

While the foregoing is directed to embodiments of the present invention, other and further embodiments of the invention may be devised without departing from the basic scope thereof, and the scope thereof is determined by the claims that follow.

What is claimed is:
1. A heat assisted magnetic recording device, comprising:
  a first temperature sensor disposed between a near field transducer and a return pole; and
  a second temperature sensor disposed between the near field transducer and the return pole, wherein the first temperature sensor and the second temperature sensor are aligned in a cross-track direction.

2. The heat assisted magnetic recording device of claim 1, wherein the first temperature sensor and the second temperature sensor each comprises a material selected from the group consisting of Ta, Pt, Au, Rh, NiFe, and alloys thereof.

3. The heat assisted magnetic recording device of claim 1, wherein the first temperature sensor and the second temperature sensor are disposed at an air bearing surface.

4. The heat assisted magnetic recording device of claim 1, wherein the first temperature sensor and the second temperature sensor are recessed from an air bearing surface.

5. The heat assisted magnetic recording device of claim 1, wherein one of the first temperature sensor or the second temperature sensor is recessed from an air bearing surface.

6. The heat assisted magnetic recording device of claim 1, further comprising a write pole, wherein the near field transducer is disposed between the first temperature sensor and the write pole.

7. The heat assisted magnetic recording device of claim 6, wherein the write pole, the near field transducer and the first temperature sensor have a same center line with respect to the cross-track direction.

8. A heat assisted magnetic recording device, comprising:
a near field transducer;
a cladding material disposed adjacent the near field transducer;
a first temperature sensor embedded in the cladding material;
a second temperature sensor embedded in the cladding material, wherein the first temperature sensor and the second temperature sensor are aligned in a cross-track direction; and
a return pole disposed adjacent the cladding material, wherein the first temperature sensor is disposed between the near field transducer and the return pole.

9. The heat assisted magnetic recording device of claim 8, wherein the first temperature sensor and the second temperature sensor each comprises a material selected from the group consisting of Ta, Pt, Au, Rh, NiFe, and alloys thereof.

10. The heat assisted magnetic recording device of claim 8, wherein the first temperature sensor and the second temperature sensor are disposed at an air bearing surface.

11. The heat assisted magnetic recording device of claim 8, wherein the first temperature sensor and the second temperature sensor are recessed from an air bearing surface.

12. The heat assisted magnetic recording device of claim 8, wherein one of the first temperature sensor or the second temperature sensor is recessed from an air bearing surface.

13. The heat assisted magnetic recording device of claim 8, further comprising a write pole, wherein the near field transducer is disposed between the first temperature sensor and the write pole.

14. The heat assisted magnetic recording device of claim 13, wherein the write pole, the near field transducer and the first temperature sensor have a same center line with respect to the cross-track direction.

15. A heat assisted magnetic recording device, comprising:
a write pole;
a pole lip disposed adjacent the write pole;
a near field transducer disposed adjacent the pole lip;
a cladding material disposed adjacent the near field transducer;
a first temperature sensor embedded in the cladding material;
a second temperature sensor embedded in the cladding material, wherein the first temperature sensor and the second temperature sensor are aligned in a cross-track direction; and
a return pole disposed adjacent the cladding material, wherein the first temperature sensor is disposed between the near field transducer and the return pole.

16. The heat assisted magnetic recording device of claim 15, wherein the first temperature sensor and the second temperature sensor each comprises a material selected from the group consisting of Ta, Pt, Au, Rh, NiFe, and alloys thereof.

17. The heat assisted magnetic recording device of claim 15, wherein the first temperature sensor and the second temperature sensor are disposed at an air bearing surface.

18. The heat assisted magnetic recording device of claim 15, wherein the first temperature sensor and the second temperature sensor are recessed from an air bearing surface.

19. The heat assisted magnetic recording device of claim 15, wherein one of the first temperature sensor or the second temperature sensor is recessed from an air bearing surface.

20. The heat assisted magnetic recording device of claim 15, wherein the write pole, the near field transducer and the first temperature sensor have a same center line with respect to the cross-track direction.

* * * * *

UNITED STATES PATENT AND TRADEMARK OFFICE
CERTIFICATE OF CORRECTION

PATENT NO. : 8,842,383 B1  
APPLICATION NO. : 13/907157  
DATED : September 23, 2014  
INVENTOR(S) : Balamane et al.

Page 1 of 1

It is certified that error appears in the above-identified patent and that said Letters Patent is hereby corrected as shown below:

In the Specification,

Column 5, Line 8, please delete "$L1_{10}$" and insert -- $L1_0$ -- therefor.

Signed and Sealed this  
Twenty-fourth Day of February, 2015

Michelle K. Lee  
*Deputy Director of the United States Patent and Trademark Office*

UNITED STATES PATENT AND TRADEMARK OFFICE
CERTIFICATE OF CORRECTION

PATENT NO. : 8,842,383 B1
APPLICATION NO. : 13/907157
DATED : September 23, 2014
INVENTOR(S) : Balamane et al.

Page 1 of 1

It is certified that error appears in the above-identified patent and that said Letters Patent is hereby corrected as shown below:

Title Page, (71) Applicants:

Please delete "Hamid Balamane, Portola Valley, CA (US); John T. Contreras, Palo Alto, CA (US); Samir Garzon, Sunnyvale, CA (US); Fu-Ying Huang, San Jose, CA (US); Lidu Huang, Danville, CA (US); Barry C. Stipe, San Jose, CA (US)" and insert --HGST Netherlands B.V., Amsterdam (NL)-- therefor.

Signed and Sealed this
Twenty-fourth Day of March, 2015

Michelle K. Lee
*Director of the United States Patent and Trademark Office*